United States Patent
Zemitis et al.

(10) Patent No.: US 10,513,934 B2
(45) Date of Patent: Dec. 24, 2019

(54) Z-NOTCH SHAPE FOR A TURBINE BLADE TIP SHROUD

(71) Applicant: General Electric Company, Schenectady, NY (US)

(72) Inventors: William Scott Zemitis, Simpsonville, SC (US); Antonio Rodriguez, Simpsonville, SC (US); Jason Adam Neville, Greenville, SC (US)

(73) Assignee: General Electric Company, Schenectady, NY (US)

( * ) Notice: Subject to any disclaimer, the term of this patent is extended or adjusted under 35 U.S.C. 154(b) by 588 days.

(21) Appl. No.: 15/410,061

(22) Filed: Jan. 19, 2017

(65) Prior Publication Data
US 2018/0202298 A1  Jul. 19, 2018

(51) Int. Cl.
*F01D 5/22* (2006.01)
*F01D 5/20* (2006.01)

(52) U.S. Cl.
CPC ............. *F01D 5/225* (2013.01); *F01D 5/20* (2013.01); *F05D 2230/80* (2013.01); *F05D 2250/74* (2013.01); *F05D 2250/75* (2013.01); *Y02T 50/671* (2013.01); *Y02T 50/673* (2013.01)

(58) Field of Classification Search
CPC ............................... F01D 5/20; F05D 2250/74
USPC ............................................. 416/223 A, 243
See application file for complete search history.

(56) References Cited

U.S. PATENT DOCUMENTS

| | | |
|---|---|---|
| 6,851,931 B1 | 2/2005 | Tomberg |
| 6,893,216 B2 | 5/2005 | Snook et al. |
| 6,913,445 B1 | 7/2005 | Beddard et al. |
| 7,509,736 B2 | 3/2009 | Boudereau et al. |
| 7,762,779 B2 | 7/2010 | Zemitis et al. |
| 7,887,295 B2 | 2/2011 | Brittingham et al. |
| 7,976,280 B2 | 7/2011 | Brittingham et al. |
| 8,043,061 B2 | 10/2011 | Chiurato et al. |
| 8,057,186 B2 | 11/2011 | Brittingham |
| 8,371,818 B2 | 2/2013 | Brittingham et al. |
| 8,807,928 B2 | 8/2014 | Kareff et al. |
| 9,322,282 B2 | 4/2016 | Chouhan et al. |
| 9,376,927 B2 | 6/2016 | Stein et al. |
| 2009/0053047 A1* | 2/2009 | Chiurato ................ F01D 5/225 415/173.1 |
| 2009/0123268 A1* | 5/2009 | Brittingham ............ F01D 5/141 415/115 |
| 2014/0147283 A1 | 5/2014 | Ward, Jr. et al. |
| 2019/0292914 A1* | 9/2019 | Zemitis ................... F01D 5/143 |

\* cited by examiner

*Primary Examiner* — Hieu T Vo
*Assistant Examiner* — Arnold Castro
(74) *Attorney, Agent, or Firm* — James W. Pemrick (57) ABSTRACT

A turbine blade includes an airfoil having a tip shroud. The tip shroud has an edge, and the edge has a profile substantially in accordance with values of X and Y in a Cartesian coordinate system set forth in Table 1 at points 1-30. The X and Y values represent distances that may be proportionally scaled by a common multiplier which, once scaled and connected, define the profile of the edge of the tip shroud. The profile of the edge lies in an envelope within +/−20%, +/−10% or +/−0% in a direction normal to any location along the edge set forth by the points in Table 1.

20 Claims, 5 Drawing Sheets

Z-NOTCH SHAPE FOR A TURBINE BLADE TIP SHROUD

BACKGROUND OF THE INVENTION

The present invention relates to turbine blades having an airfoil and a tip shroud carried by the airfoil. More specifically, the present invention relates to z-notch edge profiles for a tip shroud.

Turbine blades (or buckets) typically comprise an airfoil, a platform, a shank and a dovetail. In operation, the dovetail is secured in a complementary slot in a turbine wheel. On many airfoils, integral tip shrouds are used on the outer radial end of the airfoil to create an outer surface of the passage through which the hot gasses must pass. Having the tip shroud as a part of the airfoil increases the efficiency of the turbine engine. Moreover, in general, larger tip shrouds enhance turbine performance more than smaller ones. As such, in one respect, it is desirable to have the entire outer radial surface of the airfoil covered by a relatively large tip shroud.

During operation, tip shrouds become highly stressed because of the mechanical forces applied to them via the rotational velocity of the turbine. The high temperature environment of the turbine coupled with the high stress level quickens the rate at which these parts deform or degrade, which shortens their useful life. As a result, it is desirable that a tip shroud remain relatively small and light-weight such that operational stresses are reduced. A common practice is to remove certain portions of the tip shroud such that its weight and the resulting operational stresses are reduced while also keeping intact significant portions of the tip shroud profile for the sake of engine performance. When designing tip shrouds, finding the proper balance between these competing objectives—i.e., extended useful part life and efficient engine performance—is a challenge. As such, there is a continuing need for tip shroud edge profiles that effectively meet these dual goals.

BRIEF DESCRIPTION OF THE INVENTION

According to one aspect, a turbine blade includes an airfoil having a tip shroud. The tip shroud has an edge, and the edge has a profile substantially in accordance with values of X and Y in a Cartesian coordinate system set forth in Table 1 at points 1-30. The X and Y values represent distances that may be proportionally scaled by a common multiplier which, once scaled and connected, define the profile of the edge of the tip shroud. The profile of the edge lies in an envelope within +/−20%, +/−10% or +/−0% in a direction normal to any location along the edge set forth by the points in Table 1.

According to another aspect, a turbine blade includes an airfoil having a tip shroud, and the tip shroud has an edge in the Z-notch region. The edge has a profile substantially in accordance with values of X and Y in a Cartesian coordinate system set forth in Table 1 at points 1-30. The X and Y values represent distances that may be proportionally scaled by a common multiplier which, once scaled and connected, define the profile of the edge of the tip shroud. An origin of the Cartesian coordinate system is located at a tip of a cutter tooth on a leading edge of the tip shroud. The profile of the edge lies in an envelope within +/−20%, +/−10% or +/−0% in a direction normal to any location along the edge set forth by the points in Table 1.

According to yet another aspect, a turbine blade includes an airfoil having a tip shroud, and the tip shroud has an edge in the Z-notch region of the tip shroud. The edge has a profile substantially in accordance with values of X and Y in a Cartesian coordinate system set forth in Table 1 at points 1-30. The X and Y values represent distances that may be proportionally scaled by a common multiplier which, once scaled and connected, define the profile of the edge of the tip shroud. An origin of the Cartesian coordinate system is located at a tip of a cutter tooth on a leading edge of the tip shroud. The profile of the edge lies in an envelope within +/−20% in a direction normal to any location along the edge set forth by the points in Table 1. The X and Y values of Table 1 are non-dimensional values which, when connected by smooth, continuing arcs, define the profile of the edge of the tip shroud.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
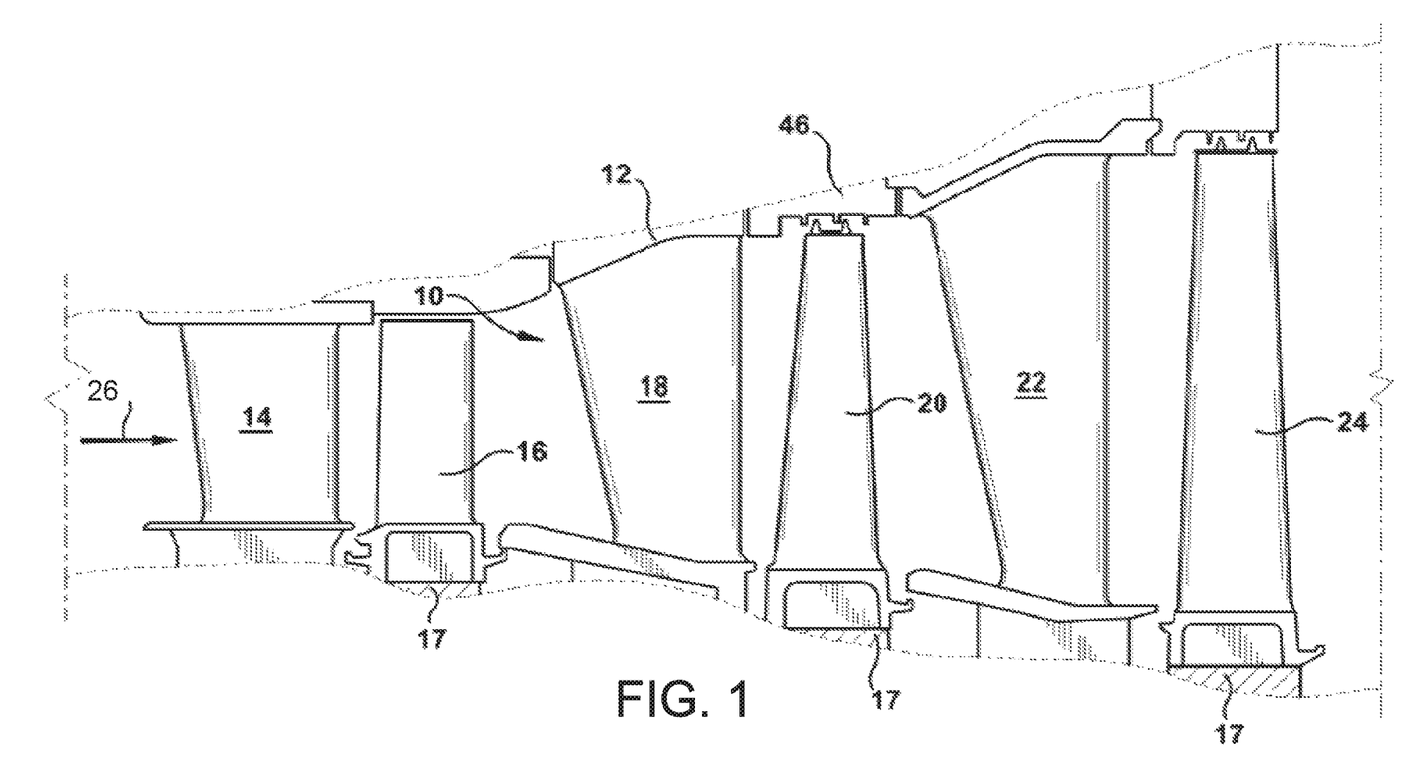
FIG. 1 illustrates a schematic representation of a hot gas path through multiple stages of a gas turbine and illustrates an exemplary turbine in which an embodiment of the present invention may operate.

Referring now to the figures, FIG. 1 illustrates a hot gas path, generally designated 10, of a gas turbine 12 that includes a plurality of turbine stages. Three stages are illustrated. A first stage may include a plurality of circumferentially spaced nozzles 14 and turbine blades (or buckets) 16. The first stage nozzles 14 generally are circumferentially spaced one from the other and fixed about the axis of the rotor (not shown). The first stage blades 16 may be mounted on a turbine wheel 17 for rotation about the rotor when hot gases are expanded through the hot gas path 10. A second stage of the turbine 12 is also illustrated. The second stage similarly may include a plurality of circumferentially spaced nozzles 18 and a plurality of circumferentially spaced blades 20 mounted on a turbine wheel 17. A third stage also is illustrated and includes a plurality of circumferentially spaced nozzles 22 and blades 24 mounted on a turbine wheel 17. It will be appreciated that the nozzles and blades lie in the hot gas path 10 of the turbine 12, and the direction of flow of the hot gas through the hot gas path 10 being indicated by the arrow 26.

Figure 2:
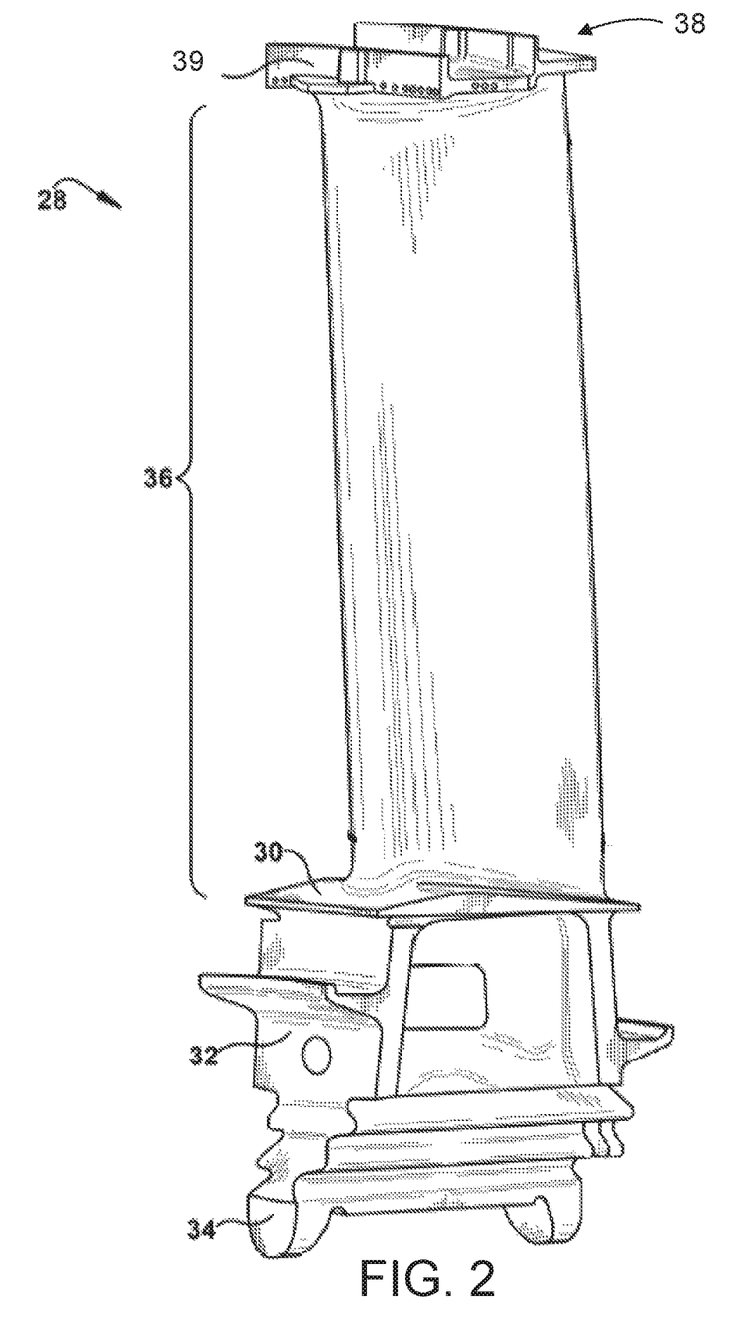
FIG. 2 illustrates a perspective view of an exemplary conventional turbine blade on which an embodiment of the present invention may operate.

As one of ordinary skill in the art will appreciate, a conventional turbine blade, generally indicated in FIG. 2 as 28, typically includes a platform 30, a shank 32, and a dovetail 34, which is used to connect the blade to a turbine wheel (not shown). Turbine blade 28 also includes an airfoil 36 that generally resides along the middle length of the blade 28. Along the airfoil 36, the blade 28 generally has a cross-sectional shape of an airfoil. Because of this shape, during operation, the flow of the hot gases induces the blade stage to rotate about the rotor such that the energy of the expanding hot gases is converted into the mechanical energy of the rotating rotor.

As further illustrated in FIG. 2, the turbine blade 28 also includes a conventional tip shroud 38. The tip shroud 38, which generally is formed as an integral part of the blade 28 at the outer radial end of the airfoil 36, provides a surface area that runs substantially perpendicular to the airfoil surface such that it caps or covers the tip of the airfoil. During operation, the tip shroud 38 engages at opposite ends the two adjacent tip shrouds of the adjacent blades such that an approximate annular ring or shroud circumscribing the hot gas path at the location of the stage of blade is formed. This annular ring holds the expanding gases of the hot path on the airfoil (i.e., it does not allow the gases to slide over the end of the airfoil blade) so that a greater percentage of energy from the working fluid may be converted into mechanical energy by the turbine blades. Tip shrouds, thusly, generally improve the performance of gas turbines. The tip shroud 38 shown incorporates two seal rails 39, however, tip shrouds may have one, two or more seal rails.

Typically, in terms of engine performance, it is desirable to have relatively large tip shrouds such that each adequately covers the entire outer radial end of the airfoil. As one of ordinary skill in the art will appreciate, during operation, tip shrouds become highly stressed due to their overhung load and rotational velocity of the turbine engine. These stresses coupled with the high temperature environment of the turbine quicken the rate at which creep causes the turbine blades to deform or degrade, which, of course, shortens the useful life of these parts. As a result, in terms of furthering the life of the turbine blades, it is desirable that tip shrouds remain relatively small and light-weight. Given these competing objectives, i.e., part-life versus engine performance, a common practice is to remove certain portions of the tip shroud (often termed "scalloping the tip shroud") such that the weight and overhung load of the tip shroud are reduced, which results in a reduction in operational stresses, while also maintaining intact significant portions of tip shroud for the sake of engine performance. As another example, a blade may be returned from the field with one or more cracks in the Z-notch region. These cracks often occur on the suction side of the blade. The cracks may be removed by machining away material on the tip shroud. One aspect provides a specifically designed shape (or profile) to reduce stresses on the tip shroud in the serviced, machined or repaired blade.

Figure 3:
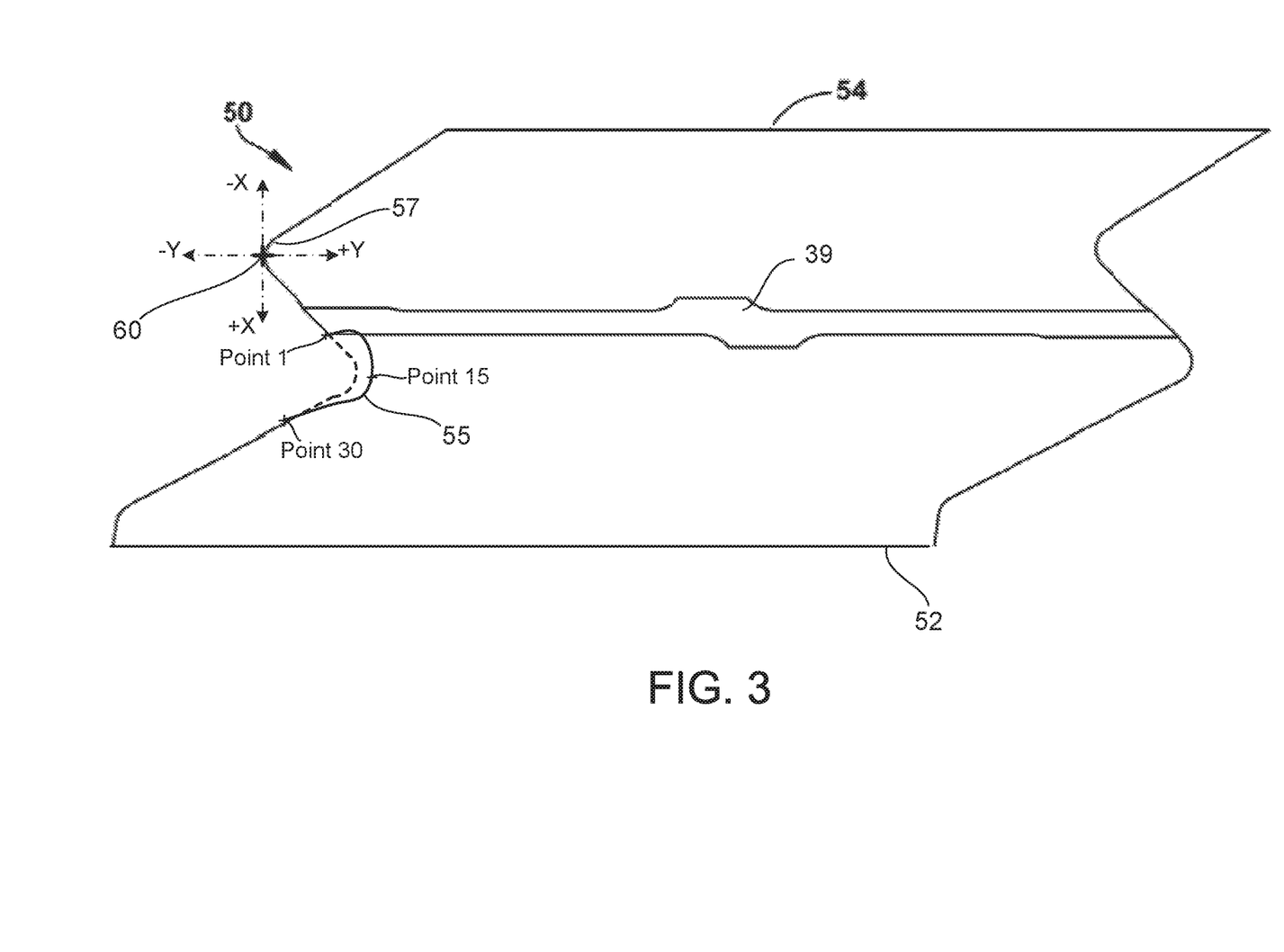
FIG. 3 illustrates a top view of a tip shroud that incorporates on one edge a profile, according to an exemplary embodiment of the present invention.

FIG. 3 illustrates a top view of a tip shroud 50 according to one aspect of the present application. As one of ordinary skill in the art will appreciate, the tip shroud 50 includes leading and trailing edges 52 and 54, respectively. That is, the edges 52 and 54 lie on opposite axial facing sides of the tip shroud 50 in the hot gas path, with the leading edge 52 generally facing upstream and the trailing edge 54 generally facing downstream. The leading edge is also on the suction side, while the trailing edge is on the pressure side of the blade 50, or vice-versa depending on the configuration of the airfoil. Also illustrated in FIG. 3 are a number of points, numbered 1, 15 and 30, with intermediate points omitted for clarity, which define an edge 55 profile of the tip shroud 50 according to an exemplary embodiment of the present application, which is discussed in greater detail below. The omitted points from FIG. 3 lie between the indicated points. For example, points 2-14 lie on the edge 55 between points 1 and 15, and points 16-29 lie between points 15 and 30 on the edge defined by the profile. Note that FIG. 3 shows the edge profile (i.e., points 1 through 30) as located on the leading edge 52 and the suction side of the tip shroud. This is exemplary. One of ordinary skill in the art will appreciate that, in some embodiments, the edge profile delineated by points 1 through 30 may be located on the leading edge 52 and/or the trailing edge 54 of the tip shroud 50 or only on the trailing edge 54, or on the pressure side of the airfoil. Further, the exemplary embodiment of FIG. 3 is primarily discussed in terms of its function on tip shrouds in a gas turbine engines. One of ordinary skill in the art will appreciate that other functions are possible, such as using scaled versions in steam turbine or aircraft engines. The edge 55 may be machined (e.g., by grinding, cutting, etc.) into the tip shroud so that material is removed from an original edge (shown in phantom).

More specifically, though it is not so limited, in some embodiments, the exemplary embodiment of FIG. 3 may be used as a tip shroud on a third stage blade in a gas turbine. Further, though it is not so limited, the exemplary embodiment of FIG. 3 in some embodiments may be used as a tip shroud in a 7FA+e (e.g., 7FA.03 or above) gas turbine engine manufactured by The General Electric Company ("GE") of Schenectady, N.Y. Finally, though it is not so limited, in other embodiments, the exemplary embodiment of FIG. 3 may be used as a tip shroud on a second stage blade in a 7FA+e gas turbine engine manufactured by The General Electric Company ("GE") of Schenectady, N.Y.

To define the shape of the tip shroud edge profile according to an exemplary embodiment of the present application, a unique set or loci of points in space may be delineated. As shown in Table 1 below and as indicated on FIG. 3, the loci that defines a tip shroud edge profile according to the current application may include a set of 30 points with X, Y coordinates relative to the origin coordinate system. More specifically, as one of ordinary skill in the art will appreciate, the coordinate system is set relative to the coordinate system origin 60 located at the tip of the cutter tooth 57. The X-axis extends generally orthogonally from the leading edge 52 to the trailing edge 54, and the Y-axis is orthogonal to the X-axis in the same plane. The Z-axis (not shown in FIG. 3) would extend into and out of the page, orthogonal to both the X and Y axes, and generally in a radial direction with respect to the turbine.

As stated, the Cartesian coordinate system of X and Y values given in Table 1 below may define the profile of a portion of the Z-notch in leading edge 52 of the tip shroud 50 according to an embodiment of the present application. More specifically, the profile of the portion of the Z-notch in leading edge 52 may be defined by the points listed such that the profile of the portion of the Z-notch in leading edge 52 can be constructed by defining approximately smooth continuing arcs through the listed points. The coordinate values for the X and Y coordinates are set forth in non-dimensional values in Table 1, so that the values can be scaled up or down by any suitable multiplier used if the values are appropriately converted.

Further, as one of ordinary skill in the art will appreciate, Table 1 coordinate values are generated and shown to six decimal places for determining the profile of the portion of the Z-notch in leading edge 52 of the tip shroud 50. These points represent the nominal cold or room temperature shape of the edge 55. As the tip shroud heats up in operation, mechanical loading and temperature will cause a change in X and Y coordinates. Accordingly, values for the airfoil shape given in Table 1 represent ambient, non-operating or non-hot conditions. Further, there are typical manufacturing and coating tolerances that must be accounted for in the actual profile of the airfoil shape. It will therefore be appreciated that +/− typical manufacturing tolerances, i.e., +/− values, including any coating thickness, are additive to the X and Y values given in Table 1 below. Accordingly, a tolerance of +/−10% or +/−20% in a direction normal to the edge defined by the points 1-30 may define the exemplary profile of the edge 55 in accordance with the embodiment of Table 1. Thus, a variation within the tolerance value (i.e., +/−10% or +/−200/%) between measured points on the profile of the edge 55 at nominal cold or room temperature and the ideal position of these points as given in the table below at the same temperature may exist. The edge profile is robust to this range of variation without impairment of mechanical function. (In addition, as one of ordinary skill in the art will appreciate, a greater tolerance range may be applicable when certain types of modifications are made to the tip shroud 50 once the part has reached the location of the turbine. Such local modification—sometimes referred to as "local blending"—may be done, for example, by a technician with a hand grinder that may be used to grind away a defect or by similar methods. When taking into account these type of local modifications, an additional tolerance value of approximately +/−20% may be used. That is, when local blending or other similar local modification practice is performed, the edge profile generally is robust to an extended tolerance range without impairment of mechanical function. Further, the edge 55 extends along the Z-axis so that the below X and Y values are substantially constant over various Z-axis values.

The coordinates of Table 1 are as follows:

TABLE 1

| Point # | X | Y |
|---|---|---|
| 1 | 0.219041 | 0.344771 |
| 2 | 0.216662 | 0.373151 |
| 3 | 0.214282 | 0.401530 |
| 4 | 0.211903 | 0.429910 |
| 5 | 0.209524 | 0.458290 |
| 6 | 0.208056 | 0.486702 |
| 7 | 0.214330 | 0.514352 |
| 8 | 0.229140 | 0.538539 |
| 9 | 0.250438 | 0.557289 |
| 10 | 0.278810 | 0.569599 |
| 11 | 0.304178 | 0.574741 |
| 12 | 0.332463 | 0.577975 |
| 13 | 0.360925 | 0.578663 |
| 14 | 0.389333 | 0.576800 |
| 15 | 0.417459 | 0.572389 |
| 16 | 0.445079 | 0.565483 |
| 17 | 0.471976 | 0.556149 |
| 18 | 0.497942 | 0.544476 |
| 19 | 0.520242 | 0.532129 |
| 20 | 0.547434 | 0.516305 |
| 21 | 0.572521 | 0.502827 |
| 22 | 0.598037 | 0.490181 |
| 23 | 0.623958 | 0.478388 |
| 24 | 0.650260 | 0.467469 |
| 25 | 0.676914 | 0.457441 |
| 26 | 0.703890 | 0.448314 |
| 27 | 0.731156 | 0.440097 |
| 28 | 0.758682 | 0.432795 |
| 29 | 0.786435 | 0.426406 |
| 30 | 0.814380 | 0.420925 |

One of ordinary skill in the art will appreciate that the tip shroud edge 55 profile disclosed in the above Table 1 above may be scaled up or down geometrically for use in other turbine stages or types of turbines, including use in steam turbines, gas turbines, or aircraft engines. Consequently, the coordinate values set forth in Table 1 may be scaled upwardly or downwardly such that the airfoil shape remains proportionally unchanged. The scalable version of the coordinates in Table 1 would be represented by X and Y coordinate values of Table 1 with X and Y coordinates multiplied or divided by a constant number. Further, one of ordinary skill in the art will appreciate that although the Z coordinates in Table 1 are not provided, as the values of Table 1 indicate, the edge profile of the tip shroud edge 55 is substantially constant in the Z direction. Given this, it will further be appreciated that the claimed edge profile, in some embodiments, may be defined as a two-dimensional shape defined by the X and Y coordinates of Table 1 at a substantially constant Z coordinate value.

Figure 4:
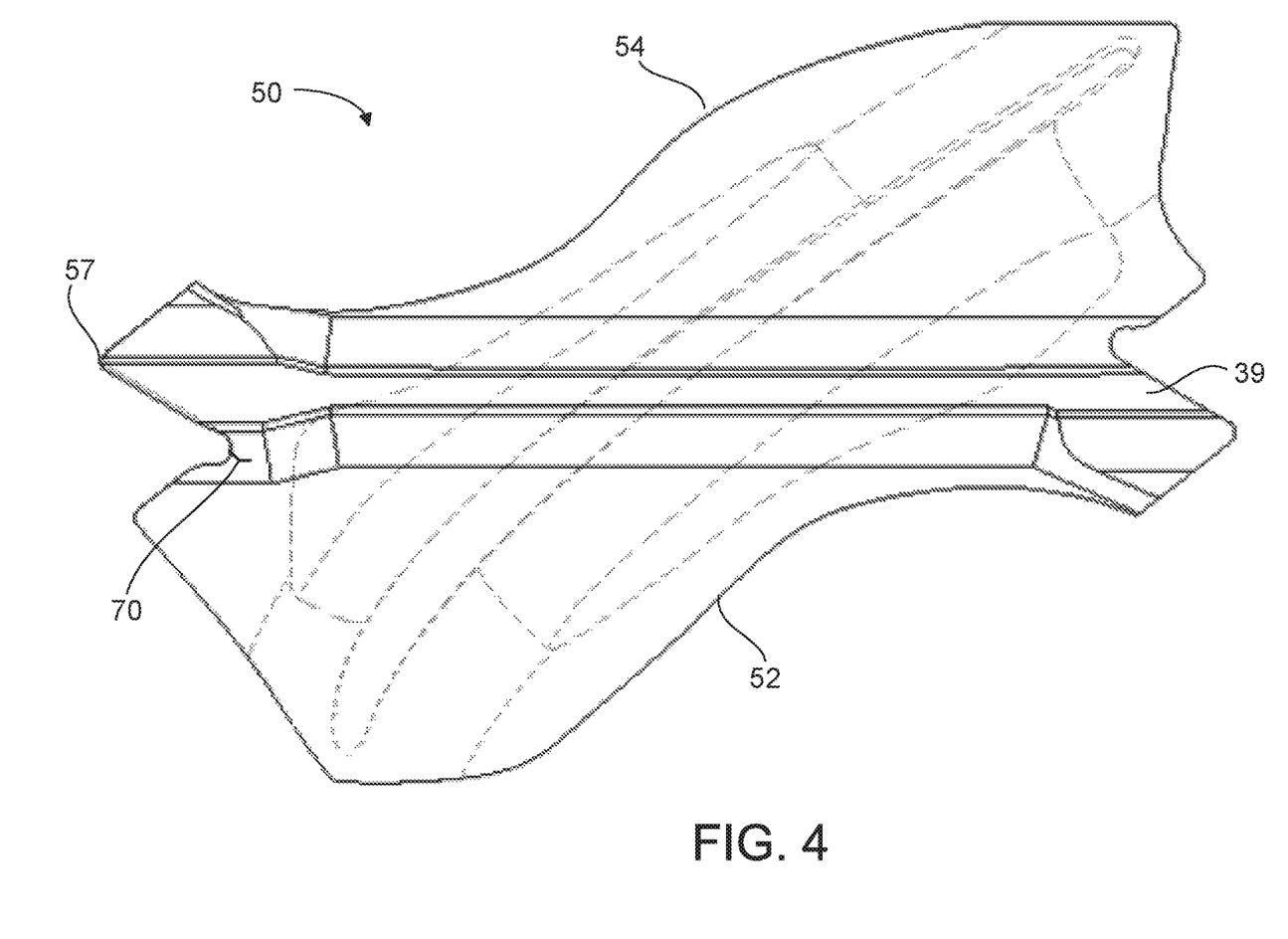
FIG. 4 illustrates a top view of a tip shroud having a crack in the Z-notch region.

FIG. 4 illustrates a top view of a tip shroud 50 having a crack 70 in the Z-notch region. The crack 70 may occur from extended service of the blade, metal fatigue, thermal cycling or any other cause of defect formation. It would be desirable to repair (or service) damaged blades so that the fatigue life in the Z-notch region is restored. This will enable blades to be reused, and reduce cost for the machine owner, as well as making energy production more economical. To repair the blade, the damaged region (or crack 70) must be removed. Removal may be through grinding, cutting, drilling or any other suitable material removal process. The shape of the edge left by this removal process is very important, as stress should be reduced to levels that ensure part longevity.

Figure 5:
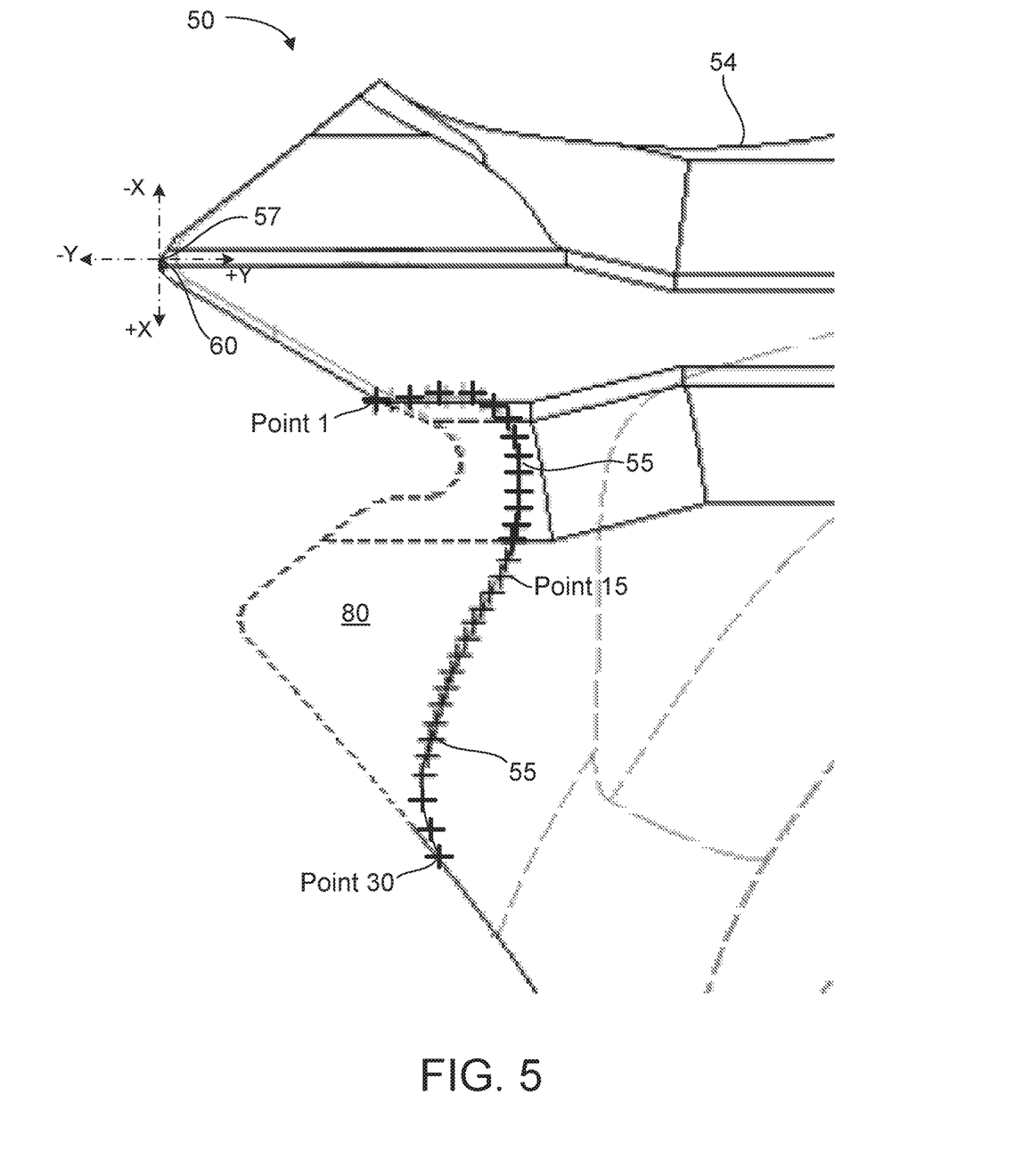
FIG. 5 illustrates a top view of a tip shroud 50 having a re-profiled Z-notch edge 55 so that damaged region or crack 70 is removed, according to an exemplary embodiment of the present invention.

FIG. 5 illustrates a top view of a tip shroud 50 having a re-profiled Z-notch edge 55 so that damaged region or crack 70 is removed. The original Z-notch edge portion is shown in phantom, as is indicated by region 80. Region 80 has been removed and the edge 55 forms the new Z-notch edge portion. The curvatures in the edge reduce stress and restore fatigue life in the blade. The edge 55 has a profile substantially in accordance with values of X and Y in a Cartesian coordinate system set forth in Table 1 at points 1-30, wherein X and Y represent distances that may be proportionally scaled by a common multiplier which, once scaled and connected, define the profile of the edge 55 of the tip shroud 50. The profile of the edge may lie in an envelope within +/−0%, +/−10% or +/−20% (as desired in the specific application) in a direction normal to any location along the edge 55 set forth by the points in Table 1. The edge 55 has a substantially constant profile in the Z direction (which is orthogonal to both the X and Y axes). The Z axis is into and out of the page in FIG. 5. As stated previously, the origin for the Cartesian coordinate system is located at the tip of the cutter tooth 57.

As described above, in terms of engine performance, it is generally desirable to have relatively large tip shrouds such that adequately cover or shroud the entire outer radial end of the airfoil. However, during operation, this overhung load generally becomes very highly stressed due to the rotational velocity of the turbine engine. These stresses coupled with the high temperature environment of the turbine may shorten the part life of the turbine blades. As a result, in terms of furthering the life of the turbine blades with integral tip shrouds, it is desirable that tip shrouds remain relatively small and light-weight.

The tip shroud shape according to the present invention effectively balances these competing objectives such that both part-life and engine performance goals may be satisfied. That is, the tip shroud shape of the present invention provides a profile that effectively covers the tip of the airfoil while maintaining operation stresses at acceptable levels. Defects, such as cracks, may also be removed from original edges by machining in the current edge 55 profile. In addition, the tip shroud shape according to the present application provides for other operational efficiencies, including, for example, stage airflow efficiency, enhanced aeromechanics, reduced thermal stresses, and reduced mechanical stresses when compared to other conventional tip shroud shapes. As one of ordinary skill in the art will appreciate, the effectiveness of the tip shroud shape according to the present invention may be verified by computational fluid dynamics (CFD); traditional fluid dynamics analysis: Euler and Navier-Stokes equations; for transfer functions, algorithms, manufacturing: manual positioning, flow testing (for example in wind tunnels), and modification of the tip shroud; in-situ testing; modeling: application of scientific principles to design or develop tip shrouds, machines, apparatus, or manufacturing processes; tip shroud flow testing and modification; combinations thereof, and other design processes and practices. These methods of determination are merely exemplary, and are not intended to limit the invention in any manner.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% or +/−20% of the stated value(s).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A turbine blade including an airfoil having a tip shroud, the tip shroud having an edge;
   wherein the edge has a profile substantially in accordance with values of X and Y in a Cartesian coordinate system set forth in Table 1 at points 1-30, wherein X and Y represent distances that may be proportionally scaled by a common multiplier which, once scaled and connected, define the profile of the edge of the tip shroud; and
   wherein the profile of the edge lies in an envelope within +/−20% in a direction normal to any location along the edge set forth by the points in Table 1.

2. The turbine blade according to claim 1, wherein the profile of the edge lies in an envelope within +/−10% in a direction normal to any location along the edge set forth by the points in Table 1.

3. The turbine blade according to claim 1, wherein the profile of the edge lies in an envelope within +/−0% in a direction normal to any location along the edge set forth by the points in Table 1.

4. The turbine blade according to claim 1, wherein the X and Y values of Table 1 are non-dimensional values which, when connected by smooth, continuing arcs, define the profile of the edge of the tip shroud.

5. The turbine blade according to claim 1, wherein the edge comprises a leading edge of the tip shroud of the turbine blade.

6. The turbine blade according to claim 1, wherein the turbine blade is configured to operate as a third stage turbine blade in a gas turbine.

7. The turbine blade according to claim 1, an origin of the Cartesian coordinate system located at a tip of a cutter tooth on a leading edge of the tip shroud.

8. The turbine blade according to claim 7, wherein the profile is on a suction side of the turbine blade.

9. A turbine blade including an airfoil having a tip shroud, the tip shroud having an edge;
   wherein the edge has a profile substantially in accordance with values of X and Y in a Cartesian coordinate system set forth in Table 1 at points 1-30, wherein X and Y represent distances that may be proportionally scaled by a common multiplier which, once scaled and connected, define the profile of the edge of the tip shroud, an origin of the Cartesian coordinate system located at a tip of a cutter tooth on a leading edge of the tip shroud; and
   wherein the profile of the edge lies in an envelope within +/−20% in a direction normal to any location along the edge set forth by the points in Table 1.

10. The turbine blade according to claim 9, wherein the profile of the edge lies in an envelope within +/−10% in a direction normal to any location along the edge set forth by the points in Table 1.

11. The turbine blade according to claim 9, wherein the profile of the edge lies in an envelope within +/−0% in a direction normal to any location along the edge set forth by the points in Table 1.

12. The turbine blade according to claim 9, wherein the X and Y values of Table 1 are non-dimensional values which, when connected by smooth, continuing arcs, define the profile of the edge of the tip shroud.

13. The turbine blade according to claim 9, wherein the edge comprises a leading edge of the tip shroud of the turbine blade.

14. The turbine blade according to claim 9, wherein the turbine blade is configured to operate as a third stage turbine blade in a gas turbine.

15. The turbine blade according to claim 9, wherein the profile is on a suction side of the turbine blade.

16. A turbine blade including an airfoil having a tip shroud, the tip shroud having an edge;
   wherein the edge has a profile substantially in accordance with values of X and Y in a Cartesian coordinate system set forth in Table 1 at points 1-30, wherein X and Y represent distances that may be proportionally scaled by a common multiplier which, once scaled and connected, define the profile of the edge of the tip shroud, an origin of the Cartesian coordinate system located at a tip of a cutter tooth on a leading edge of the tip shroud; and
   wherein the profile of the edge lies in an envelope within +/−20% in a direction normal to any location along the edge set forth by the points in Table 1, and wherein the X and Y values of Table 1 are non-dimensional values which, when connected by smooth, continuing arcs, define the profile of the edge of the tip shroud.

17. The turbine blade according to claim 16, wherein the profile of the edge lies in an envelope within +/−10% in a direction normal to any location along the edge set forth by the points in Table 1.

18. The turbine blade according to claim 17, wherein the edge comprises a leading edge of the tip shroud of the turbine blade.

19. The turbine blade according to claim 18, wherein the turbine blade is configured to operate as a third stage turbine blade in a gas turbine.

20. The turbine blade according to claim 19, wherein the profile is on a suction side of the turbine blade.

\* \* \* \* \*